(12) United States Patent
Kim et al.

(10) Patent No.: US 9,444,830 B2
(45) Date of Patent: Sep. 13, 2016

(54) WEB SERVER/WEB APPLICATION SERVER SECURITY MANAGEMENT APPARATUS AND METHOD

(71) Applicant: ELECTRONICS AND TELECOMMUNICATIONS RESEARCH INSTITUTE, Daejeon (KR)

(72) Inventors: Jong-Myoung Kim, Daejeon (KR); Jaeseo Lee, Daejeon (KR); SuYong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 14/477,986

(22) Filed: Sep. 5, 2014

(65) Prior Publication Data
US 2015/0264067 A1 Sep. 17, 2015

(30) Foreign Application Priority Data

Mar. 13, 2014 (KR) ........................ 10-2014-0029376

(51) Int. Cl.
*H04L 12/00* (2006.01)
*H04L 29/06* (2006.01)

(52) U.S. Cl.
CPC ........... *H04L 63/1416* (2013.01); *H04L 63/20* (2013.01); *H04L 63/1441* (2013.01)

(58) Field of Classification Search
CPC .... H04L 63/14; H04L 63/20; H04L 63/0227
USPC ...................................... 726/22–25
See application file for complete search history.

(56) References Cited

U.S. PATENT DOCUMENTS

| 2002/0083344 | A1* | 6/2002 | Vairavan | H04L 29/12009 726/13 |
| 2005/0177871 | A1* | 8/2005 | Roesch | H04L 63/0263 726/13 |
| 2012/0124661 | A1 | 5/2012 | Lee et al. | |

FOREIGN PATENT DOCUMENTS

| KR | 10-2009-0132787 A | 12/2009 |
| KR | 10-2010-0133859 A | 12/2010 |
| KR | 10-1006372 B1 | 1/2011 |
| KR | 10-2011-0033018 A | 3/2011 |

* cited by examiner

*Primary Examiner* — Alexander Lagor
(74) *Attorney, Agent, or Firm* — LRK Patent Law Firm

(57) ABSTRACT

A security management apparatus and method for a web server/web application server is provided. The security management apparatus includes a connection state table storage unit for, as a web client accesses a web server/web application server, storing connection state information, an access time, and a connection policy. A connection state information inspection unit inspects whether current connection state information is present in connection state information of the connection state table storage unit in which the connection policy is set to blocking. If current connection state information is not present, a web session reuse attack determination unit determines whether a current connection is a web session reuse attack. If the current connection is not the web session reuse attack, an attack pattern analysis unit analyzes whether an attack pattern is present. A blocking unit blocks a connection between the web client and the web server/web application server.

20 Claims, 9 Drawing Sheets

| CONNECTION STATE INFORMATION | | | ACCESS TIME | CONNECTION POLICY |
|---|---|---|---|---|
| IP | SSL/TLS SESSION TICKET(ST) | WEB SESSION (WS) | | |
| $IP_1$ | $ST_1$ | $WS_1$ | 2013.10.23 09:10 | PERMISSION |
| $IP_2$ | $ST_2$ | $WS_2$ | 2013.10.23 13:23 | BLOCKING |
| $IP_3$ | $ST_3$ | $WS_3$ | 2013.10.23 21:57 | PERMISSION |
| ... | ... | ... | ... | ... |

FIG. 6

WEB SERVER/WEB APPLICATION SERVER SECURITY MANAGEMENT APPARATUS AND METHOD

CROSS REFERENCE TO RELATED APPLICATION

This application claims the benefit of Korean Patent Application No. 10-2014-0029376, filed Mar. 13, 2014, which is hereby incorporated by reference in its entirety into this application.

BACKGROUND OF THE INVENTION

1. Technical Field

The present invention relates generally to a security management apparatus and method for a web server/web application server and, more particularly, to an apparatus and method that prevent continuous attacks on a web server/web application server.

2. Description of the Related Art

In the past, a web server/web application server was protected in such a way as to analyze the content of traffic that is transmitted to the web server/web application server, determine whether an attack pattern is present, and block the corresponding traffic or the Internet Protocol (IP) address of the system that transmitted the attack traffic.

However, since an attacker makes an attack by disguising an IP address so as to conceal his or her location, an additional attack can be made by easily changing an IP address using The Onion Router (TOR), a proxy server, or the like even if the IP address is blocked. Consequently, an attacker collects detection patterns while repeatedly blocking and changing IP addresses, and then eventually makes an attack bypassing the detection patterns, thus possibly occupying the web server/web application server.

That is, when an attacker secures a sufficient IP band needed to make an attack, a scheme for blocking attack traffic as in the case of the conventional art merely causes the attacker to undergo a slight inconvenience and time consumption required to change an IP address, and has limitations in dealing with a high level of difficulty of an attack or in blocking additional attacks. In other words, in the past, an attack was defended using a method of checking the content of traffic that is transmitted or received to or from the web server/web application server, detecting attack patterns and then blocking the corresponding IP address. However, when an attacker makes an attack by changing an IP address, the attacker whose IP address has been changed cannot be additionally blocked, and thus there is a limitation in blocking attacks that intelligently change IP addresses.

As related preceding technology, U.S. Patent Application Publication No. 2012-0124661 (entitled "Method for detecting a web application attack") discloses web application attack detection technology for separating only payloads from the packets of received Hypertext Transfer Protocol (HTTP) traffic, recombining the HTTP traffic, analyzing the content of the recombined HTTP traffic using a parser, and determining whether content related to an attack is included in the HTTP traffic.

SUMMARY OF THE INVENTION

Accordingly, the present invention has been made keeping in mind the above problems occurring in the prior art, and an object of the present invention is to provide a security management apparatus and method for a web server/web application server, which are configured such that, even if an attacker whose attack pattern has been detected at least once desires to change an IP address and access the web server/web application server, the attacker is detected and access itself by the attacker is blocked, thus making it difficult for the attacker to make continuous attacks.

In accordance with an aspect of the present invention to accomplish the above object, there is provided a security management apparatus for a web server/web application server, including a connection state table storage unit for, as a web client accesses a web server/web application server, storing connection state information, an access time, and a connection policy in a form of a table; a connection state information inspection unit for, inspecting whether current connection state information acquired in response to a connection request of the web client is present in connection state information of the connection state table storage unit in which the connection policy is set to blocking; a web session reuse attack determination unit for, if the acquired current connection state information is not present in the connection state information of the connection state table storage unit in which the connection policy is set to blocking, determining whether a current connection is a web session reuse attack; an attack pattern analysis unit for, if it is determined that the current connection is not the web session reuse attack, checking content of traffic and analyzing whether an attack pattern is present; and a blocking unit for blocking a connection between the web client and the web server/web application server based on results obtained from the connection state information inspection unit, the web session reuse attack determination unit, and the attack pattern analysis unit.

The connection state information inspection unit may include a connection state information extraction unit for extracting Internet Protocol (IP) address information, Secure Sockets Layer (SSL)/Transport Layer Security (TLS) Session Ticket (ST) information, and Web Session (WS) information from a current connection request session of the web client; an IP blocking determination unit for receiving the IP address information of the current connection from the connection state information extraction unit, and determining whether the IP address information of the current connection is present in connection state information of a connection state table of the connection state table storage unit in which the connection policy is set to blocking; an ST blocking determination unit for receiving the SSL/TLS session ticket information of the current connection from the connection state information extraction unit, and determining whether the SSL/TLS session ticket information of the current connection is present in the connection state information of the connection state table of the connection state table storage unit in which the connection policy is set to blocking; and a WS blocking determination unit for receiving the web session information of the current connection from the connection state information extraction unit, and determining whether the web session information of the current connection is present in the connection state information of the connection state table of the connection state table storage unit in which the connection policy is set to blocking.

The IP blocking determination unit may send a connection blocking command to the blocking unit if the IP address information of the current connection is present in a blocking list.

The ST blocking determination unit may send a connection blocking command to the blocking unit if the SSL/TLS session ticket information of the current connection is present in a blocking list.

The WS blocking determination unit may send a connection blocking command to the blocking unit if the web session information of the current connection is present in a blocking list.

The connection state information may include IP address information, SSL/TLS Session Ticket (ST) information, and Web Session (WS) information.

The web session reuse attack determination unit may include an identical WS connection inquiry unit for inquiring of the connection state table of the connection state table storage unit so as to determine whether a previous connection having web session information identical to the web session information of the current connection from the connection state information inspection unit is present; and an ST identicalness determination unit for, if the previous connection is present as a result of inquiry by the identical WS connection inquiry unit, determining whether SSL/TLS session ticket information of the previous connection is identical to SSL/TLS session ticket information of the current connection from the connection state information inspection unit.

The ST identicalness determination unit may be configured to, if the SSL/TLS session ticket information of the previous connection is not identical to the SSL/TLS session ticket information of the current connection, detect the current connection as a web session reuse attack, and notify the blocking unit of detection of the web session reuse attack.

The blocking unit may be configured to, if results of inspection indicating that the current connection is a connection to be blocked are received from the connection state information inspection unit, block a connection between the web client and the web server/web application server.

The blocking unit may be configured to, if results of determination indicating that the current connection is a web session reuse attack are received from the web session reuse attack determination unit, block a connection between the web client and the web server/web application server.

The blocking unit may be configured to, if an attack pattern is received from the attack pattern analysis unit, block a connection between the web client and the web server/web application server.

The security management apparatus may further include a connection state information registration unit for registering the current connection state information, together with the access time and the connection policy, in the connection state table storage unit, based on results obtained from the connection state information inspection unit, the web session reuse attack determination unit, and the attack pattern analysis unit.

The connection state information registration unit may register the current connection state information, together with the access time and the connection policy, in the connection state table storage unit, if the current connection state information is not a blocked connection as a result of inspection by the connection state information inspection unit, if the current connection is not a web session reuse attack as a result of determination by the web session reuse attack determination unit, and if an attack pattern is not present as a result of analysis by the attack pattern analysis unit.

In accordance with another aspect of the present invention to accomplish the above object, there is a security management method for a web server/web application server, including inspecting, by a connection state information inspection unit, whether current connection state information acquired in response to a connection request of a web client is present in connection state information of a connection state table storage unit in which a connection policy is set to blocking; determining, by a web session reuse attack determination unit, whether a current connection is a web session reuse attack if the acquired current connection state information is not present in the connection state information; analyzing, by an attack pattern analysis unit, whether an attack pattern is present by checking content of traffic if it is determined that the current connection is not a web session reuse attack; and blocking a connection between the web client and the web server/web application server based on results of the inspection, determination, and analysis.

Inspecting the current connection state information may include extracting IP address information, SSL/TLS session ticket information, and web session information from a current connection request session of the web client; determining whether the extracted IP address information of the current connection is present in connection state information of a connection state table of the connection state table storage unit in which the connection policy is set to blocking; determining whether the extracted SSL/TLS session ticket information of the current connection is present in the connection state information of the connection state table of the connection state table storage unit in which the connection policy is set to blocking; and determining whether the extracted web session information of the current connection is present in the connection state information of the connection state table of the connection state table storage unit in which the connection policy is set to blocking.

Determining whether the current connection is the web session reuse attack may include inquiring of the connection state table of the connection state table storage unit so as to determine whether a previous connection having web session information identical to the web session information of the current connection is present, based on the web session information of the current connection obtained from the inspection; and if the previous connection is present as a result of the inquiry, determining whether SSL/TLS session ticket information of the previous connection is identical to SSL/TLS session ticket information of the current connection.

The security management method may further include registering, by a connection state information registration unit, the current connection state information, together with the access time and the connection policy, in the connection state table storage unit, based on results of inspecting whether the acquired current connection state information is present, results of determining whether the current connection is the web session reuse attack, and results of analyzing whether the attack pattern is present.

Registering the current connection state information may include if a connection identical to the current connection state information is present in the connection state table, updating time information; and if a connection identical to the current connection state information is not present in the connection state table, registering the current connection state information as a new connection in the connection state table.

The connection state information may include IP address information, SSL/TLS Session Ticket (ST) information, and Web Session (WS) information.

Blocking the connection may include blocking all connections associated with the IP address, the SSL/TLS session ticket, and the web session that correspond to the current connection state information.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram illustrating a connection state table applied to an embodiment of the present invention;

DESCRIPTION OF THE PREFERRED EMBODIMENTS

Figure 1:
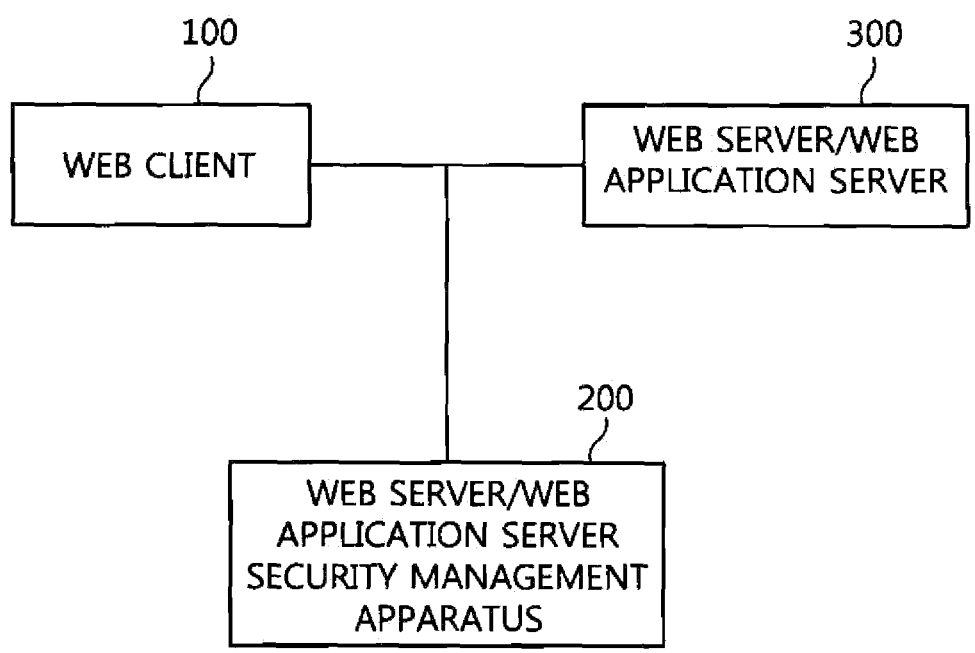
FIG. 1 is a configuration diagram showing a system employing a security management apparatus for a web server/web application server according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a configuration diagram showing a system employing a security management apparatus for a web server/web application server according to an embodiment of the present invention.

A security management apparatus 200 for a web server/web application server (hereinafter referred to as a "web server/web application server security management apparatus 200") is installed between a web client 100 and a web server/web application server 300. Here, the web client 100 denotes a terminal device (for example, a personal computer (PC), a laptop computer, or a mobile phone) capable of accessing the web server/web application server 300 in a wired or wireless manner.

The web server/web application server security management apparatus 200 analyzes the content of the traffic of the web client 100, which is transmitted to the web server/web application server 300, detects an attack made by an attacker, and blocks access to the web server/web application server 300.

In particular, the web server/web application server security management apparatus 200 may identify an attacker whose IP address has been changed, and block access itself by the attacker to the web server/web application server 300, thus preventing additional attacks from being made. That is, the web server/web application server security management apparatus 200 may prevent attacks from being made based on the server connection state information of the identified attacker, that is, IP address, Secure Sockets Layer (SSL)/Transport Layer Security (TLS) session ticket information, and web session information.

Figure 2:
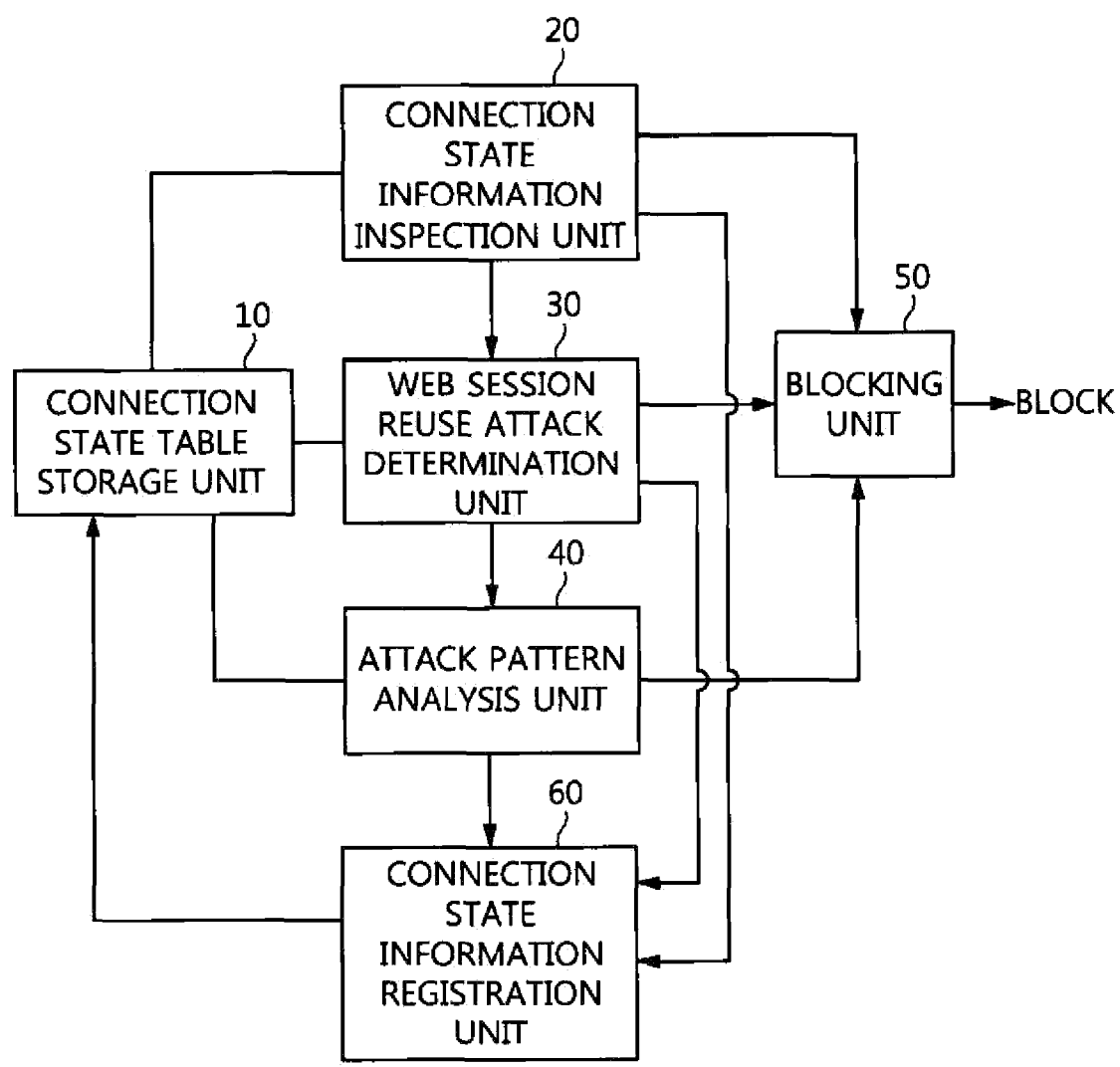
FIG. 2 is a configuration diagram showing the internal configuration of the web server/web application server security management apparatus shown in FIG. 1.

FIG. 2 is a diagram showing the internal configuration of the web server/web application server security management apparatus shown in FIG. 1.

The web server/web application server security management apparatus 200 includes a connection state table storage unit 10, a connection state information inspection unit 20, a web session reuse attack determination unit 30, an attack pattern analysis unit 40, a blocking unit 50, and a connection state information registration unit 60.

The connection state table storage unit 10 stores an access time and a connection policy, together with connection state information (that is, an IP address, an SSL/TLS session ticket (ST), a web session (WS), etc.), obtained when the web client 100 accesses the web server/web application server 300, in the form of a table. In other words, the connection state table may be regarded as including the IP address information of a network layer, the SSL/TLS session ticket information of a session layer, and the web session information of an application layer, and also including a recent time at which a connection is formed, and a connection policy for the corresponding connection.

The connection state information inspection unit 20 obtains current connection state information (that is, an IP address, an SSL/TLS session ticket (ST), and a web session (WS)) in response to the connection request of the web client 100, and inspects whether the obtained current IP address information, SSL/TLS session ticket (ST) information, or web session (WS) information is present in connection state information of the connection state table of the connection state table storage unit 10 in which the connection policy is set to "blocking." That is, if the connection request of the web client 100 is received, the connection state information inspection unit 20 inspects the connection state information with reference to the connection state table of the connection state table storage unit 10.

If the corresponding connection is not a blocked connection as a result of inspection by the connection state information inspection unit 20, the web session reuse attack determination unit 30 determines whether the corresponding connection is a web session (WS) reuse attack.

If it is determined by the web session reuse attack determination unit 30 that the corresponding connection is not a web session (WS) reuse attack, the attack pattern analysis unit 40 checks the content of HTTP or Hypertext Transfer Protocol Secure (HTTPS) traffic, and analyzes whether an attack pattern is present. The attack pattern analysis unit 40 may detect an attack pattern as a result of analysis.

The blocking unit 50 blocks a connection between the web client 100 and the web server/web application server 300 based on the results obtained from the connection state information inspection unit 20, the web session reuse attack determination unit 30, and the attack pattern analysis unit 40. In other words, if the results of inspection indicating that the corresponding connection is a connection to be blocked are received from the connection state information inspection unit 20, the blocking unit 50 blocks the connection between the web client 100 and the web server/web application server 300. Further, if the results of determination indicating that the corresponding connection is a web session reuse attack are received from the web session reuse attack determination unit 30, the blocking unit 50 blocks the connection between the web, client 100 and the web server/web application server 300. Meanwhile, if an attack pattern is received from the attack pattern analysis unit 40, the blocking unit 50 blocks the connection between the web client 100 and the web server/web application server 300. In other words, the blocking unit 50 may be regarded as blocking all connections associated with the IP address, the SSL/TLS session ticket, and the web session that correspond to the current connection state information.

The connection state information registration unit 60 registers current connection state information (that is, an IP address, an SSL/TLS session ticket (ST), and a web session (WS)), together with the access time and the connection policy, in the connection state table storage unit 10, based on the results obtained from the connection state information inspection unit 20, the web session reuse attack determination unit 30, and the attack pattern analysis unit 40. That is, if, as the result of the inspection by the connection state information inspection unit 20, the current connection state, information is not a blocked connection, and, as the result of determination by the web session reuse attack determination unit 30, the current connection is not a web session reuse attack, and if, as the result of analysis by the attack pattern analysis unit 40, an attack pattern is not present, the connection state information registration unit 60 registers the current connection state information (that is, the IP address, the SSL/TLS session ticket (ST), and the web session (WS)), together with the access time and the connection policy, in the connection state table storage unit 10. In this case, the connection state information registration unit 60 may update time information if a connection having connection state information identical to the current connection state information is present in the connection state table, and may register the current connection state information as a new connection in the connection state table if any connection having connection state information identical to the current connection state information is not present in the connection state table.

Figure 3:
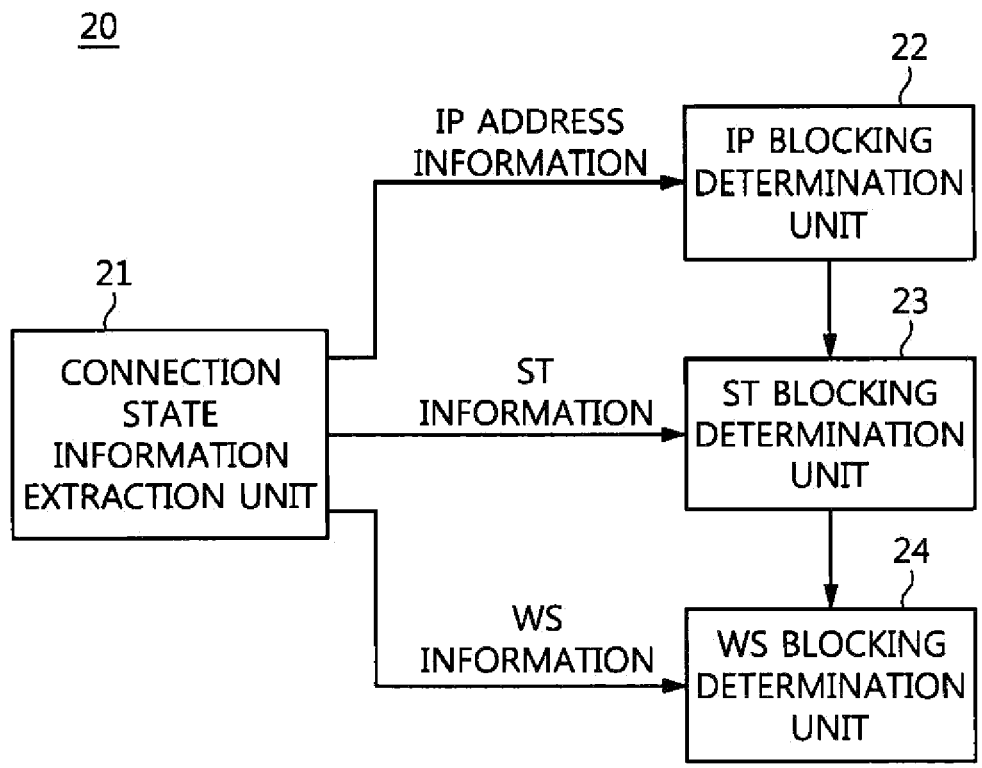
FIG. 3 is a configuration diagram showing the internal configuration of a connection state information inspection unit shown in FIG. 2.

FIG. 3 is a configuration diagram showing the internal configuration of the connection state information inspection unit 20 shown in FIG. 2.

The connection state information inspection unit 20 includes a connection state information extraction unit 21, an IP blocking determination unit 22, an ST blocking determination unit 23, and a WS blocking determination unit 24.

The connection state information extraction unit 21 extracts (acquires) IP address information, SSL/TLS session ticket (ST) information, and web session (WS) information from the current connection request session of the web client 100.

The IP blocking determination unit 22 receives IP address information from the connection state information extraction unit 21, and determines whether the IP address of the current connection is present in the connection state information of the connection state table of the connection state table storage unit 10 in which the connection policy is set to "blocking." If the received IP address of the current connection is present in a blocking list, the IP blocking determination unit 22 may send a connection blocking command to the blocking unit 50.

The ST blocking determination unit 23 receives the SSL/TLS session ticket (ST) information from the connection state information extraction unit 21, and determines whether the SSL/TLS session ticket (ST) of the current connection is present in the connection state information of the connection state table information of the connection state table storage unit 10 in which the connection policy is set to "blocking." The ST blocking determination unit 23 may send a connection blocking command to the blocking unit 50 if the received SSL/TLS session ticket (ST) of the current connection is present in the blocking list.

The WS blocking determination unit 24 receives web session (WS) information from the connection state information extraction unit 21, and determines whether the WS of the current connection is present in the connection state information of the connection state table of the connection state table storage unit 10 in which the connection policy is set to "blocking." The WS blocking determination unit 24 may send a connection blocking command to the blocking unit 50 if the received WS of the current connection is present in the blocking list.

Figure 4:
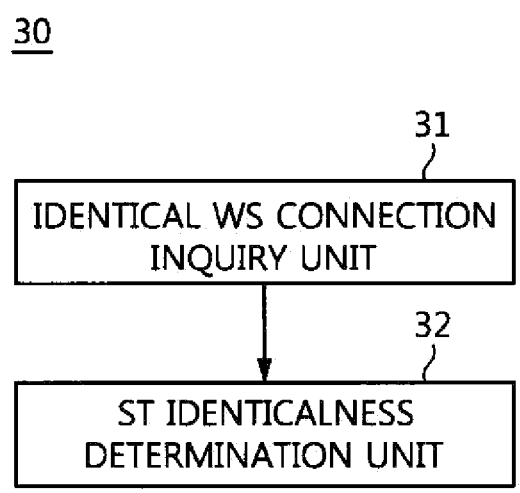
FIG. 4 is a configuration diagram showing the internal configuration of a web session reuse attack determination unit shown in FIG. 2.

FIG. 4 is a configuration diagram showing the internal configuration of the web session reuse attack determination unit 30 shown in FIG. 2.

The web session reuse attack determination unit 30 includes an identical WS connection inquiry unit 31 and an ST identicalness determination unit 32.

The identical WS connection inquiry unit 31 inquires of the connection state table of the connection state table storage unit 10 so as to determine whether a previous connection having a web session (WS) identical to the WS of the current connection is present, based on the results, of inspection by the connection state information inspection unit 20 (the WS information of the web client 100 currently requested to be connected).

The ST identicalness determination unit 32 determines whether the SSL/TLS session ticket (ST) of the current connection is identical to the SSL/TLS session ticket (ST) of the previous connection if the previous connection is present as a result of the inquiry by the identical WS connection inquiry unit 31. If the ST of the current connection is not identical to that of the previous connection, the ST identicalness determination, unit 32 detects the current connection as a web session reuse attack, and notifies the blocking unit 50 of the web session reuse attack.

Figure 5:
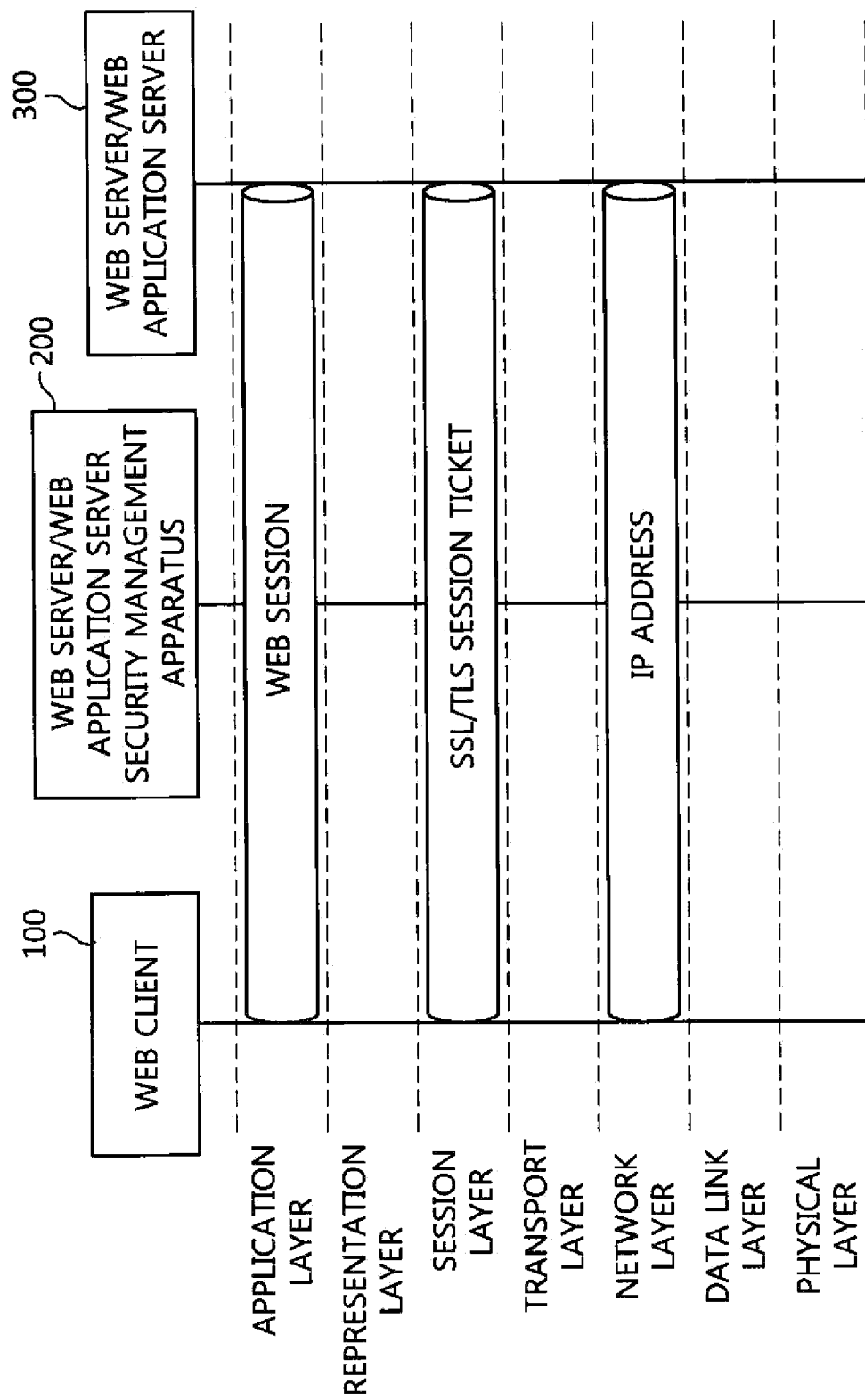
FIG. 5 is a diagram showing three types of connection state information of a web client that can be checked by the web server/web application server security management apparatus when the web client shown in FIG. 1 accesses the web server/web application server.

FIG. 5 is a diagram showing three types of connection state information of the web client 100 that can be checked by the web server/web application server security management apparatus 200 when the web client 100 shown in FIG. 1 accesses the web server/web application server 300.

The web server/web application security management apparatus 200 may check three types of connection state information (that is, an IP address, an SSL/TLS session ticket, and a web session) of the web client 100.

Here, an IP address denotes the IP address of a network layer in which the web client 100 accesses the web server/web application server 300.

An SSL/TLS session ticket (ST) denotes an ID allocated to each session when the web client 100 attempts to access a security channel such as a Hypertext Transfer Protocol Secure (HTTPS) channel in a session layer.

A web session denotes the identification value of an application layer required by the web server/web application server 300 to identify the web client 100 in the application layer.

In this way, since pieces of connection state information are divided into those of a network layer, a session layer, and an application layer in an Open Systems Interconnection model (OSI) layer model, they are independently operated in different layers and do not influence each other.

FIG. 6 is a diagram illustrating a connection state table applied to an embodiment of the present invention.

Whenever the web client 100 accesses the web server/web application server 300, an access time and a connection policy, together with connection state information, that is, an IP address, an SSL/TLS session ticket (ST), and a web session (WS), are stored in the connection state table of the connection state table storage unit 10. The connection state table may be regarded as having the form of a lookup table.

Here, a connection policy denotes a field indicating whether to block or permit a connected session based on the corresponding connection state information. The default value of the connection policy is "permission", but if an attack pattern is detected in the corresponding connection, the connection policy is changed to "blocking."

An access time denotes information about a time required to maintain the connection state information. In the case of a connection that is not used for a long period of time, 'access time' may be used to delete the corresponding connection.

Figure 7:
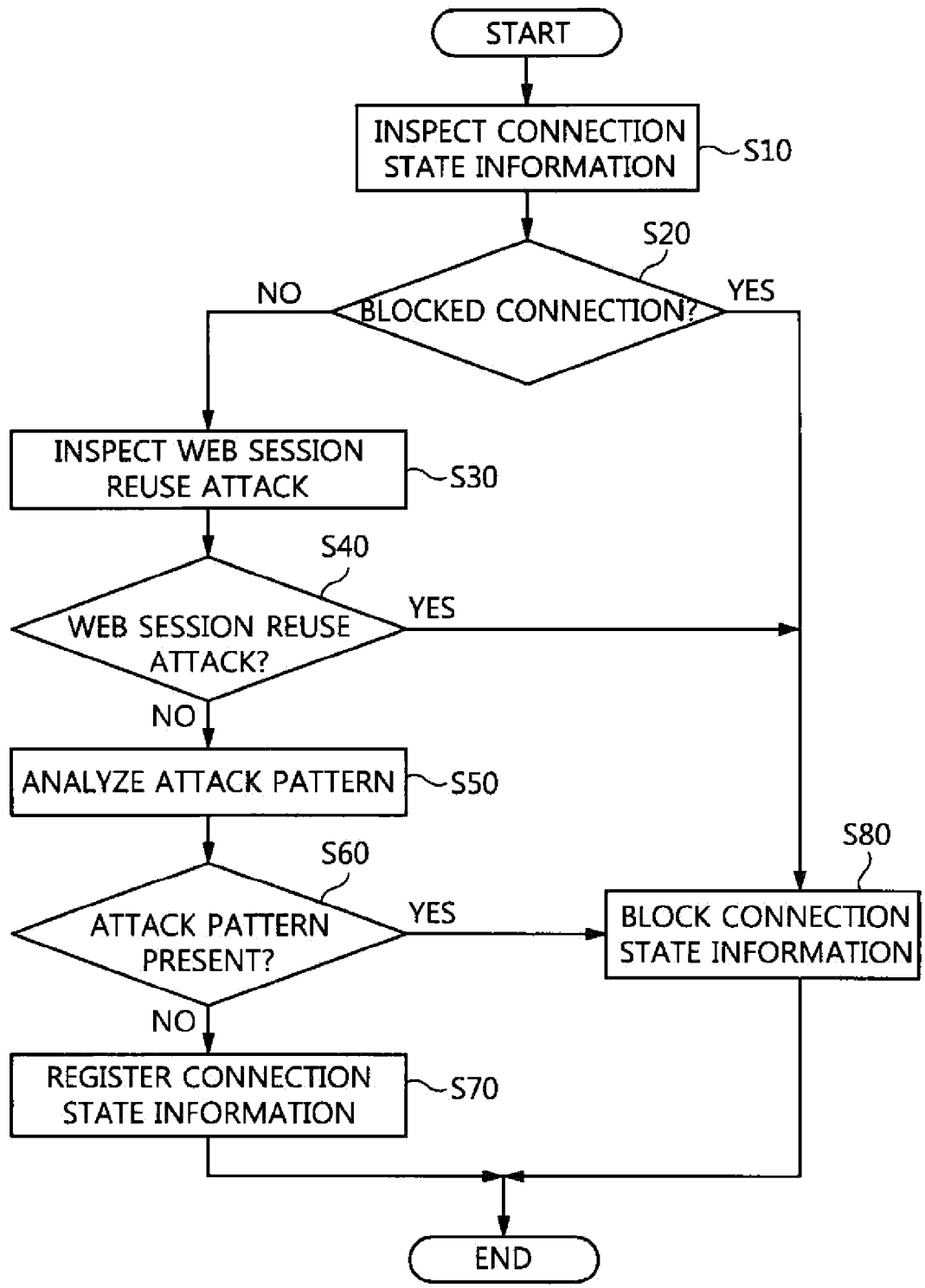
FIG. 7 is a flowchart showing a security management method for a web server/web application server according to an embodiment of the present invention.

FIG. 7 is a flowchart showing a security management method for a web server/web application server according to an embodiment of the present invention. That is, FIG. 7 is a flowchart showing a process in which the web server/web application security management apparatus 200 identifies an attacker based on the connection state table of the connection state table storage unit 10 and then blocks a connection made by the attacker to the web server/web application server 300.

First, when the connection request of the web client 100 is received, the connection state information inspection unit 20 of the web server/web application security management apparatus 200 inspects connection state information with reference to the connection state table at step S10. In this case, whether the corresponding connection is a blocked connection is determined.

As a result of inspection of the connection state information, if the connection is a blocked connection ("Yes" at step S20), the connection state information is blocked at step S80. That is, the connection is blocked by the blocking unit 50.

If the connection is not a blocked connection ("No" at step S20), the web session reuse attack determination unit 30 checks whether the connection is a web session reuse attack at step S30.

If it is checked that the connection is the web session reuse attack ("Yes" at step S40), the process proceeds to connection state information blocking step S80, thus blocking the corresponding connection. That is, the connection is blocked by the blocking unit 50.

In contrast, if the connection is not a web session reuse attack ("No" at step S40), the attack pattern analysis unit 40 checks the content of HTTP or HTTPS traffic, and then analyzes whether an attack pattern is present at step S50.

If, as a result of the analysis by the attack pattern analysis unit 40, an attack pattern is detected ("Yes" at step S60), the process proceeds to connection state information blocking step S80. That is, the attack pattern is blocked by the blocking unit 50.

In contrast, if an attack pattern is not detected ("No" at step S60), current connection state information is registered in the connection state table at connection state information registration step S70, and the connection to the web server/web application server 300 is permitted to enable service to be provided. Here, the registration of the connection state information is performed by the connection state information registration unit 60.

Figure 8:
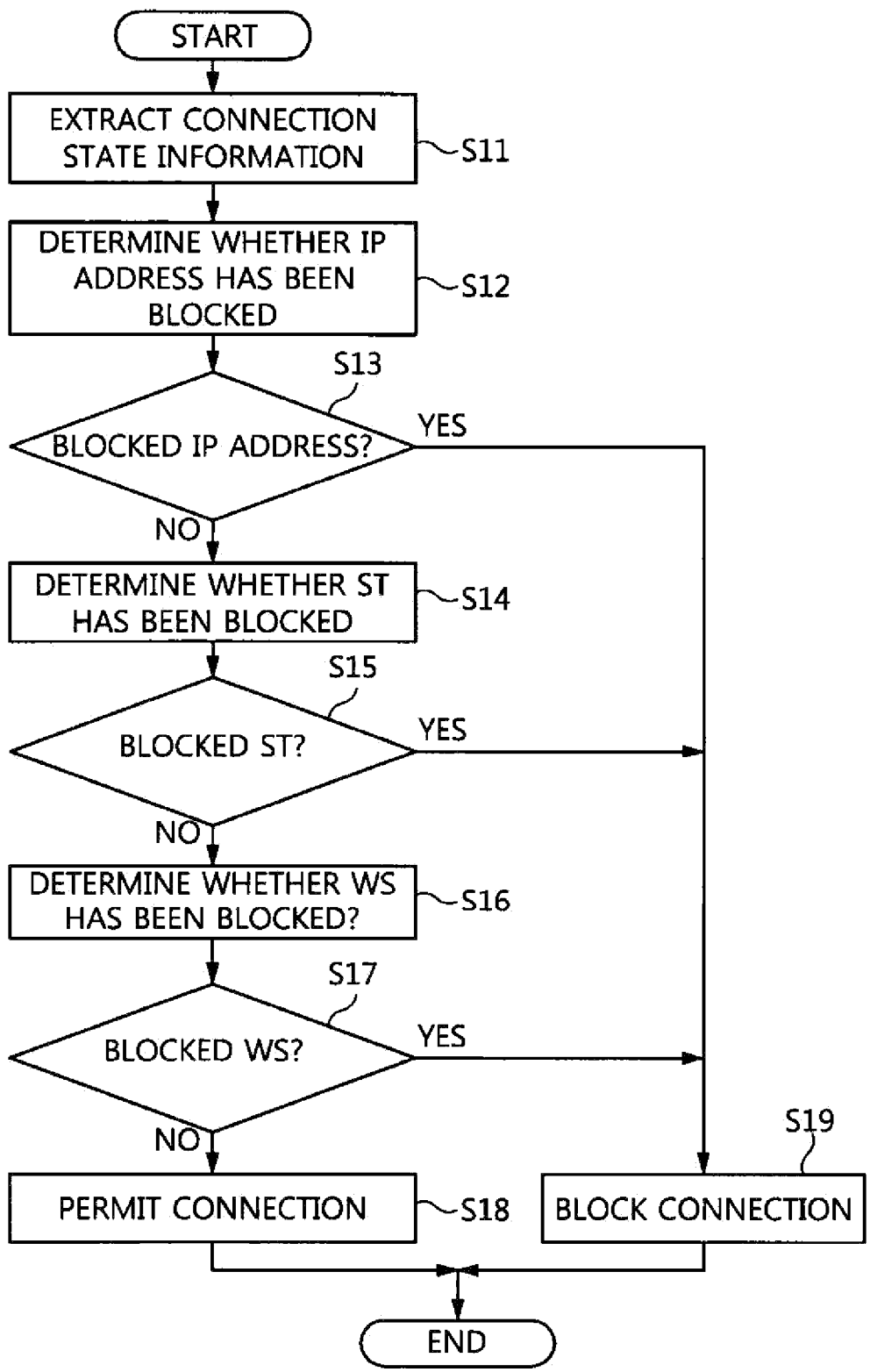
FIG. 8 is a flowchart showing in detail a connection state information inspection step shown in FIG. 7.

FIG. 8 is a flowchart showing in detail the connection state information inspection step S10 shown in FIG. 7. The connection state information inspection step corresponds to an operation performed by the connection state information inspection unit 20.

First, the connection state information inspection unit 20 extracts connection state information at step S11. That is, the connection state information extraction unit 21 of the connection state information inspection unit 20 acquires IP address information, SSL/TLS session ticket (ST) information, and WS information from a current connection request session.

Then, the IP blocking determination unit 22 determines whether the IF' address of the current connection is present in connection state information of the connectable state table of the connection state table storage unit 10 in which the connection policy is set to "blocking" at step S12.

If the IP address of the current connection is present in a blocking list ("Yes" at step S13), the process proceeds to connection blocking step S19.

In contrast, if the IP address of the current connection is not present in the blocking list ("No" at step S13), the ST blocking determination unit 23 determines whether the current connection is a blocked ST at step S14. That is, the ST blocking determination unit 23 determines whether the ST of the current connection is present in the connection state information of the connection state table of the connection state table storage unit 10 in which the connection policy is set to "blocking."

If the ST of the current connection is present in the blocking list ("Yes" at step S15), the process proceeds to connection blocking step S19.

In contrast, if the ST of the current connection is not present in the blocking list ("No" at step S15), the WS blocking determination unit 24 determines whether the WS of the current connection is a blocked WS at step S16. That is, the WS blocking determination unit 24 determines whether the WS of the current connection is present in the connection state information of the connection state table of the connection state table storage unit 10 in which the connection policy is set to "blocking."

If the WS of the current connection is present in the blocking list ("Yes" at step S17), the process proceeds to connection blocking step S19.

In contrast, if the WS of the current connection is not present in the blocking list ("No" at step S17), the process proceeds to connection permission step S18.

Even an attacker accessing the web server/web application server by changing an IP address at the connection state information inspection step S10 operated as described above may be blocked based on the SSL/TLS session ticket (ST) and the web session (WS).

Figure 9:
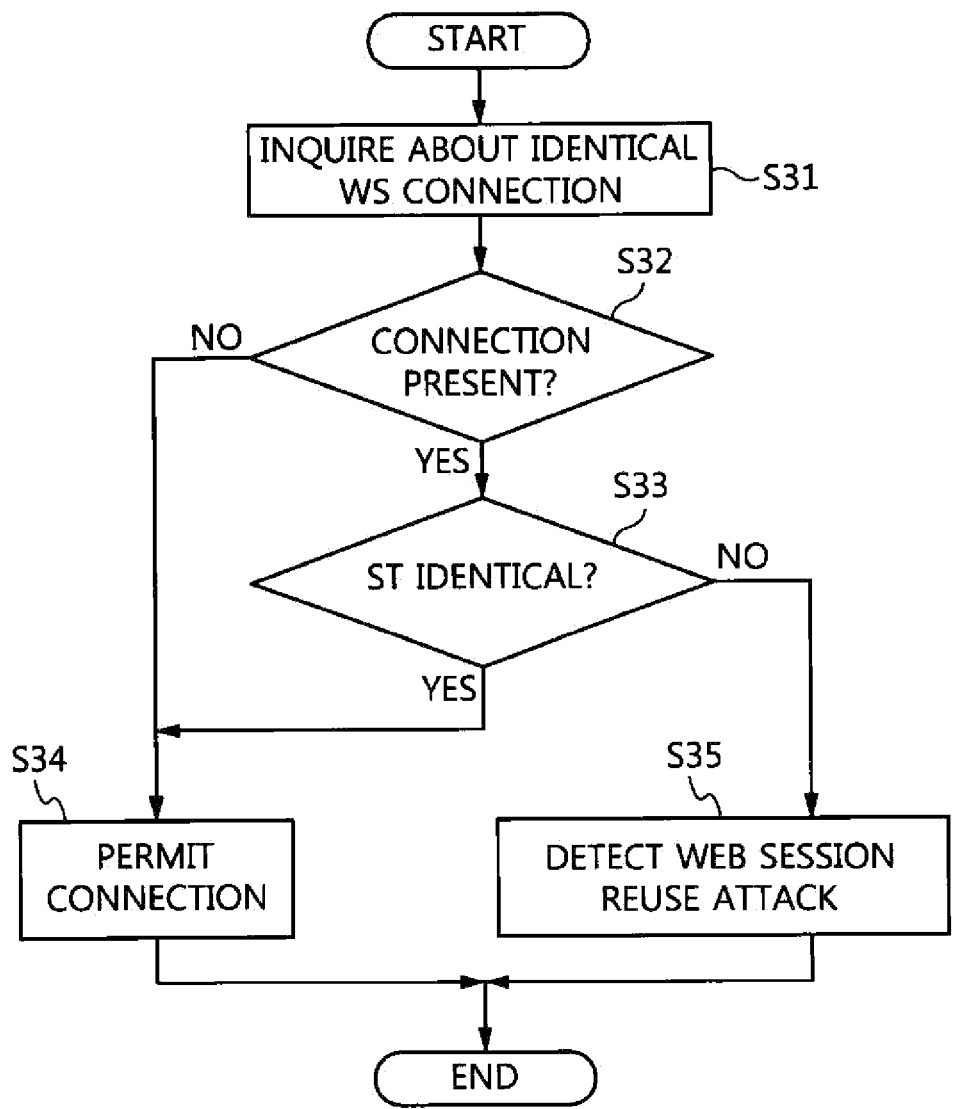
FIG. 9 is a flowchart showing in detail a web session reuse attack inspection step shown in FIG. 7.

FIG. 9 is a flowchart showing in detail the web session reuse attack inspection step S30 shown in FIG. 7. The web session reuse attack inspection step S30 is the operation performed by the web session reuse attack determination unit 30.

A web session reuse attack denotes a reuse attack made using another tool by exploiting a web session used once. For example, when an attacker detects a vulnerable page while accessing the sub-page of a homepage after accessing the web server/web application server 300 using Microsoft Internet Explorer, the attacker uses an attack tool, such as Acunetix, so as to insert an attack code. In this case, a request query transmitted from the Internet Explorer is copied to Acunetix and is then revised. At this time, a web session included in cookie used in the Internet Explorer is also copied together with the request query. That is, even if an attack is made using Acunetix, a web session identical to that of the Internet Explorer is used. However, since a tool for accessing the web server/web application server 300 has changed, the SSL/TLS session ticket (ST) of a session layer has changed. The reason for this is that an SSL connection must be newly generated for each application program. In order to detect such a web session reuse attack, the following inspection is performed at the web session reuse attack inspection step S30.

First, the identical WS connection inquiry unit 31 of the web session reuse attack determination unit 30 inquires whether a connection having an identical WS is present at step S31. That is, the identical WS connection inquiry unit 31 inquires of the connection information table of the connection state table storage unit 10 whether a previous connection having a WS identical to the WS of the current connection is present.

If a previous connection having a WS identical to the WS of the current connection is not present ("No" at step S32), a current user is a new user, and thus the connection of the new user is permitted at step S34.

In contrast, if the previous connection having a WS identical to the WS of the current connection is present ("Yes" at step S32), the ST identicalness determination unit 32 determines whether the ST of the current connection is identical to the ST of the previous connection at step S33.

If the ST of the current connection is identical to that of the previous connection ("Yes" at step S33), the user is a normal user, and thus the connection of the user is permitted step S34.

In contrast, if the ST of the current connection is not identical to that of the previous connection ("No" at step S33), the ST identicalness determination unit 32 detects the current connection as a web session reuse attack at step S35. In this way, the ST identicalness determination unit 32 notifies the blocking unit 50 of the detection of the web session reuse attack if the web session reuse attack has been detected.

Figure 10:
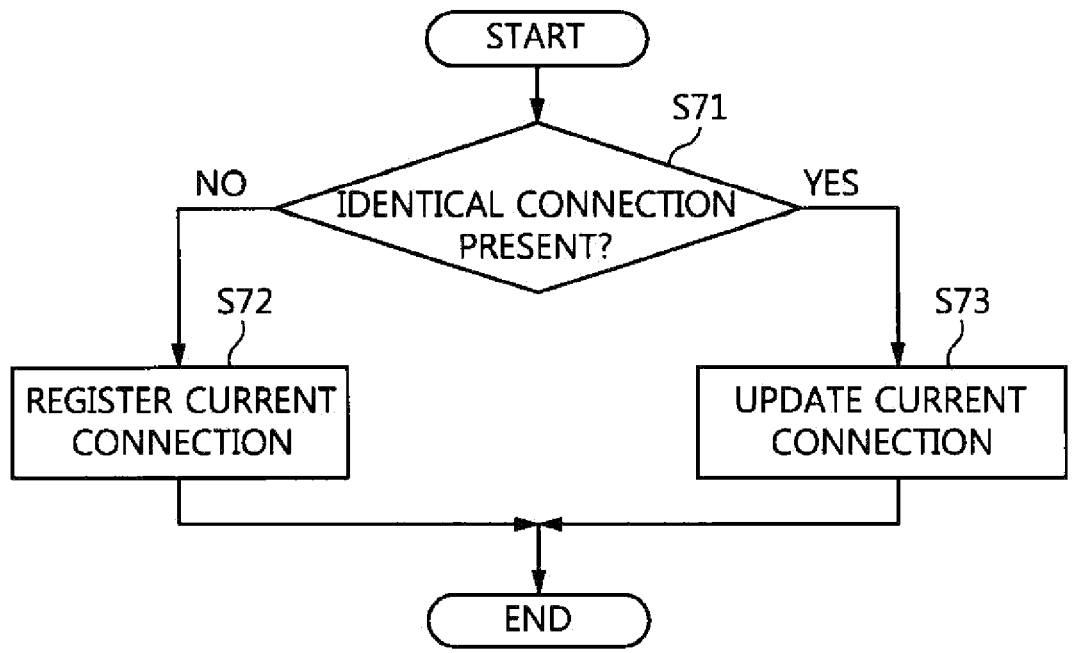
FIG. 10 is a flowchart showing in detail a connection state information registration step shown in FIG. 7.

FIG. 10 is a flowchart showing in detail the connection state information registration step S70 shown in FIG. 7.

It is determined whether a connection, the IP address, ST, and WT of which are identical to an IP address, an ST, and a WS which correspond to the connection state information of a current connection, is present in the connection state table at step S71.

If the identical connection is present, the access time is updated with a current time at current connection update step S73.

In contrast, if an identical connection is not present in the connection state table, the current connection state information is registered in the connection state table at step S72.

Figure 11:
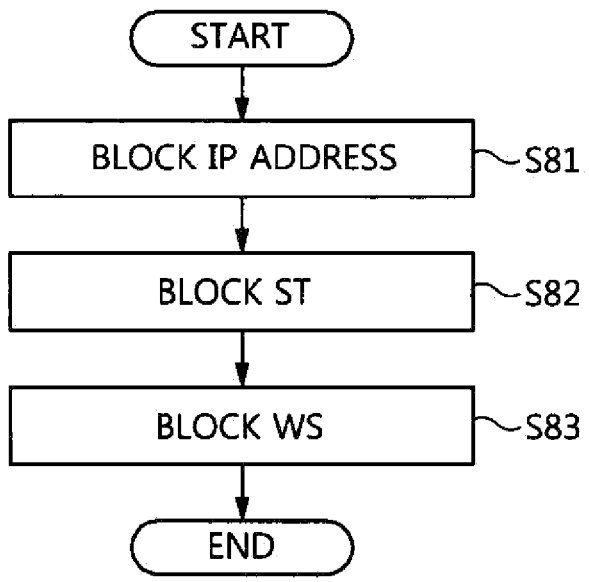
FIG. 11 is a flowchart showing in detail a connection state information blocking step shown in FIG. 7.

FIG. 11 is a flowchart showing in detail the connection state information blocking step S80 shown in FIG. 7.

First, at IP address blocking step S81, connection policies are changed to 'blocking' for all connections having the same IP address in the connection state table of the connection state table storage unit 10.

At ST blocking step S82, connection policies are changed to 'blocking' for all connections having the same ST in the connection state table of the connection state table storage unit 10.

At WS blocking step S83, connection polices are changed to 'blocking' for all connections having the same WS in the connection state table of the connection state table storage unit 10.

That is, all connections including IP addresses, STs, and WSs related to connections detected as attacks are blocked.

In accordance with the present invention having the above configuration, the SSL/TLS session ticket (ST) of a session layer and the web session (WS) of an application layer are used as a means enabling attackers to be identified, as well as the IP address of a network layer, so that even if an attacker makes an attack by changing an IP address, the attacker whose IP address has been changed can be blocked using ST and WS, thus making it impossible for the attacker to make continuous attacks.

In order for an attacker to bypass a detection method according to the present invention, the attacker must change an IP address, terminate a program used for attacking, and be allocated a new web session. In order to be allocated a new web session, a login procedure must be performed using a web client, and an attack must be performed using only the corresponding web client rather than an attack tool. The reason for this is that when request content including a web session is copied and used for an attack tool program, the present invention detects this attack as a web session reuse attack, and thus immediately blocks the corresponding attack. That is, an attacker can temporarily bypass the detection method of the present invention, but the allocation of a new IP address, a new ST, and a new WS per detection not only greatly increases the time required for attacking, but also greatly raises the level of difficulty of an attack tool because the attack tool cannot be arbitrarily used.

As described above, optimal embodiments of the present invention have been disclosed in the drawings and the specification. Although specific terms have been used in the present specification, these are merely intended to describe the present invention and are not intended to limit the meanings, thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A security management apparatus for a web server/web application server, comprising:
    a connection state table storage unit for storing connection state information, an access time, and a connection policy in a form of a table, connection state information being stored associated with a web client assessing a web server/web application server;
    in response to receipt of a current connection request of the web client, a connection state information inspection unit for inspecting whether current connection state information corresponding to the current connection request being present in the connection state information of the connection state table storage unit which being set to blocking, the inspection further being performed at least one of
    whether Internet Protocol (IP) address information corresponding to the current connection request being detected in the connection state information of the connection state table storage unit,
    whether Secure Sockets Layer (SSL)/Transport Layer Security (TLS) session ticket information corresponding to the current connection request being detected in the connection state information of the connection state table storage unit, and
    whether Web Session (WS) information corresponding to the current connection request being detected in the connection state information of the connection state table storage unit;
    in response to detection of the current connection state information corresponding to the current connection request not being detected in the connection state information of the connection state table storage unit, a web session reuse attack determination unit for determining whether the current connection request is a web session reuse attack;
    in response to determination that the current connection request is not the web session reuse attack, an attack pattern analysis unit for, checking content of traffic and analyzing whether an attack pattern is present; and
    a blocking unit for blocking a connection between the web client and the web server/web application server based on results obtained from the connection state information inspection unit, the web session reuse attack determination unit, and the attack pattern analysis unit.

2. The security management apparatus of claim 1, wherein the connection state information inspection unit comprises:
    a connection state information extraction unit for extracting the Internet Protocol (IP) address information, the Secure Sockets Layer (SSL)/Transport Layer Security (TLS) Session Ticket (ST) information, and the Web Session (WS) information from the current connection request session of the web client;
    an IP blocking determination unit for receiving the IP address information of the current connection request from the connection state information extraction unit, and determining whether the IP address information of the current connection request is present in connection state information of a connection state table of the connection state table storage unit in which the connection policy is set to blocking;
    an ST blocking determination unit for receiving the SSL/TLS session ticket information of the current connection request from the connection state information extraction unit, and determining whether the SSL/TLS session ticket information of the current connection request is present in the connection state information of the connection state table of the connection state table storage unit in which the connection policy is set to blocking; and
    a WS blocking determination unit for receiving the web session information of the current connection request from the connection state information extraction unit, and determining whether the web session information of the current connection request is present in the connection state information of the connection state table of the connection state table storage unit in which the connection policy is set to blocking.

3. The security management apparatus of claim 2, wherein the IP blocking determination unit sends a connection blocking command to the blocking unit in response to detection the IP address information of the current connection request is present in a blocking list.

4. The security management apparatus of claim 2, wherein the ST blocking determination unit sends a connection blocking command to the blocking unit in response to detection the SSL/TLS session ticket information of the current connection request is present in a blocking list.

5. The security management apparatus of claim 2, wherein the WS blocking determination unit sends a connection blocking command to the blocking unit in response to detection the web session information of the current connection request is present in a blocking list.

6. The security management apparatus of claim 1, wherein the connection state information includes IP address information, SSL/TLS Session Ticket (ST) information, and Web Session (WS) information.

7. The security management apparatus of claim 2, wherein the web session reuse attack determination unit comprises:
    an identical WS connection inquiry unit for inquiring of the connection state table of the connection state table storage unit so as to determine whether a previous connection having web session information identical to the web session information of the current connection request from the connection state information inspection unit is present; and
    an ST identicalness, determination unit for, in response to detection the previous connection is present as a result of inquiry by the identical WS connection inquiry unit, determining whether SSL/TLS session ticket information of the previous connection is identical to SSL/TLS session ticket information of the current connection request from the connection state information inspection unit.

8. The security management apparatus of claim 7, wherein the ST identicalness determination unit is configured to, in response to detection the SSL/TLS session ticket information of the previous connection is not identical to the SSL/TLS session ticket information of the current connection request, detect the current connection request as a web session reuse attack, and notify the blocking unit of detection of the web session reuse attack.

9. The security management apparatus of claim 1, wherein the blocking unit is configured to, in response to detection of results of inspection indicating that the current connection request is a connection to be blocked are received from the connection state information inspection unit, block a connection between the web client and the web server/web application server.

10. The security management apparatus of claim 1, wherein the blocking unit is configured to, in response to detection of results of determination indicating that the current connection request is a web session reuse attack are received from the web session reuse attack determination unit, block a connection between the web client and the web server/web application server.

11. The security management apparatus of claim 1, wherein the blocking unit is configured to, in response to detection an attack pattern is received from the attack pattern analysis unit, block a connection between the web client and the web server/web application server.

12. The security management apparatus of claim 1, further comprising a connection state information registration unit for registering the current connection state information, together with the access, time and the connection policy, in the connection state table storage unit, based on results obtained from the connection state information inspection unit, the web session reuse attack determination unit, and the attack pattern analysis unit.

13. The security management apparatus of claim 12, wherein the connection state information registration unit registers the current connection state information, together with the access time and the connection policy, in the connection state table storage unit, in response to detection the current connection state information is not a blocked connection as a result of inspection by the connection state information inspection unit, in response to detection the current connection request is not a web session reuse attack as a result of determination by the web session reuse attack determination unit, and in response to detection an attack pattern is not present as a result of analysis by the attack pattern analysis unit.

14. A computer implemented security management method for a web server/web application server, the method comprising:
 inspecting, by a processor, whether current connection state information acquired in response to a connection request of a web client is present in connection state information of a connection state table storage unit in which a connection policy is set to blocking, the inspecting comprising at least one of
 inspecting whether Internet Protocol (IP) address information corresponding to the connection request being detected in the connection state information,
 inspecting whether Secure Sockets Layer (SSL)/Transport Layer Security (TLS) session ticket information corresponding to the connection request being detected in the connection state information, and
 inspecting whether Web Session (WS) information corresponding to the connection request being detected in the connection state information;
 determining whether a current connection is a web session reuse attack in response to detection the acquired current connection state information is not present in the connection state information;
 analyzing whether an attack pattern is present by checking content of traffic in response to determination that the current connection is not a web session reuse attack; and blocking a connection between the web client and the web server/web application server based on results of the inspection, determination, and analysis.

15. The security management method of claim 14, wherein inspecting the current connection state information comprises:
 extracting the IP address information, the SSL/TLS session ticket information, and the web session information from a current connection request session of the web client;
 determining whether the extracted IP address information of the current connection is present in connection state information of a connection state table of the connection state table storage unit in which the connection policy is set to blocking;
 determining whether the extracted SSL/TLS session ticket information of the current connection is present in the connection state information of the connection state table of the connection state table storage unit in which the connection policy is set to blocking; and
 determining whether the extracted web session information of the current connection is present in the connection state information of the connection state table of the connection state table storage unit in which the connection policy is set to blocking.

16. The security management method of claim 15, wherein determining whether the current connection is the web session reuse attack comprises:
 inquiring of the connection state table of the connection state table storage unit so as to determine whether a previous connection having web session information identical to the web session information of the current connection is present, based on the web session information of the current connection obtained from the inspection; and
 in response to detection the previous connection is present as a result of the inquiry, determining whether SSL/TLS session ticket information of the previous connection is identical to SSL/TLS session ticket information of the current connection.

17. The security management method of claim 14, further comprising:
 registering the current connection state information, together with the access time and the connection policy, in the connection state table storage unit, based on results of inspecting whether the acquired current connection state information is present, results of determining whether the current connection is the web session reuse attack, and results of analyzing whether the attack pattern is present.

18. The security management method of claim 17, wherein registering the current connection state information comprises:
 in response to detection a connection identical to the current connection state information is present in the connection state table, updating time information; and
 in response to detection a connection identical to the current connection state information is not present in the connection state table, registering the current connection state information as a new connection in the connection state table.

19. The security management method of claim 14, wherein connection state information includes IP address information, SSL/TLS Session Ticket (ST) information, and Web Session (WS) information.

20. The security management method of claim 19, wherein blocking the connection comprises blocking all connections associated with the IP address, the SSL/TLS session ticket, and the web session that correspond to the current connection state information.

\* \* \* \* \*